(12) United States Patent
Okamoto et al.

(10) Patent No.: US 7,868,908 B2
(45) Date of Patent: Jan. 11, 2011

(54) IMAGE RECORDING APPARATUS HAVING A LASER SOURCE

(75) Inventors: Hiroshi Okamoto, Kyoto (JP); Hiroyuki Fujisawa, Kyoto (JP); Yuji Kurokawa, Kyoto (JP); Keisuke Hirayama, Kyoto (JP); Hitoshi Shioda, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 362 days.

(21) Appl. No.: 12/071,738

(22) Filed: Feb. 26, 2008

(65) Prior Publication Data
US 2008/0205457 A1    Aug. 28, 2008

(30) Foreign Application Priority Data
Feb. 26, 2007    (JP) .............................. 2007-045509

(51) Int. Cl.
*B41J 2/435*    (2006.01)
*B41J 2/47*    (2006.01)
(52) U.S. Cl. ....................... 347/234; 347/248
(58) Field of Classification Search ................ 347/229, 347/234, 235, 248–250
See application file for complete search history.

(56) References Cited

U.S. PATENT DOCUMENTS

| 5,258,776 A | * | 11/1993 | Guy et al. | .................... 347/237 |
| 6,724,415 B2 | | 4/2004 | Nomoto et al. | |
| 6,731,317 B2 | * | 5/2004 | Ema et al. | .................... 347/135 |
| 6,937,264 B2 | * | 8/2005 | Kanno | .................... 347/250 |
| 7,369,148 B2 | * | 5/2008 | Shiraishi | .................... 347/235 |

FOREIGN PATENT DOCUMENTS

JP    3544593    4/2004

* cited by examiner

*Primary Examiner*—Hai C Pham
(74) *Attorney, Agent, or Firm*—McDermott Will & Emery LLP

(57) ABSTRACT

An image recording apparatus according to this invention includes a frequency divider 22 for generating a reference signal of a frequency higher than that of a dot clock signal, a pulse exposure control circuit 31 for causing a laser beam emitted from a laser diode 27 to irradiate a recording medium when both an image signal and the reference signal are ON, and a switching device 25 for switching between a first recording mode for causing the laser beam emitted from the laser diode 27 to irradiate the recording medium when the image signal is ON, and a second recording mode for causing the laser beam emitted from the laser diode 27 to irradiate the recording medium when both the image signal and reference signal are ON.

10 Claims, 6 Drawing Sheets

IMAGE RECORDING APPARATUS HAVING A LASER SOURCE

BACKGROUND OF THE INVENTION

1. Field of the Invention

This invention relates to an image recording apparatus for irradiating a recording medium with a laser beam emitted from a laser source, based on image signals created with reference to a dot clock signal corresponding to a resolution and the like of an image to be recorded.

2. Description of the Related Art

An image recording apparatus, as described in Japan Patent No. 3544593, for example, includes a recording drum having a recording medium mounted peripherally thereof, a rotating mechanism for rotating the recording drum about its axis, and a recording head having a laser source and movable axially of the recording drum. While irradiating the recording medium with a laser beam from the laser source, its irradiation point is moved in a primary scanning direction by rotation of the recording drum, and moved in a secondary scanning direction by movement of the recording head.

When an image is recorded on various types of recording medium using such an image recording apparatus, the image sometimes cannot be recorded properly due to a difference in sensitivity between the recording mediums.

In a CTP (computer-to-plate) apparatus for making a printing plate for flexography, for example, an image may be recorded on both a flexographic plate with low sensitivity and an offset printing plate with high sensitivity. When the image is recorded on the offset printing plate by employing a construction that can record the image on the flexographic plate with low sensitivity, the intensity of the laser beam is too strong for the sensitivity of the plate. The laser beam can irradiate a larger area than is required, or damage the surface of the printing plate. Thus, the image cannot be recorded properly.

To avoid such an inconvenience, it is conceivable to lower the intensity of the laser beam outputted from the laser source by reducing electric current applied to the laser source. However, there is a limit to the intensity of the laser beam reducible by this technique. When the current applied to the laser source is reduced below a certain level, there will arise a problem that the beam profile of the laser beam emitted from the laser source changes.

It is also conceivable, as described in Japan Patent No. 3544593, to lower the intensity of the laser beam by reducing a pulse width when recording dots forming each image. In such a case, however, the area of the dots forming each image becomes small, resulting in a problem that formation of a proper image becomes difficult.

SUMMARY OF THE INVENTION

The object of this invention is to provide an image recording apparatus capable of recording images properly both on a recording medium with low sensitivity and on a recording medium with high sensitivity, which is achieved by enabling images to be recorded properly also on the recording medium with low sensitivity.

The above object is fulfilled, according to this invention, by an image recording apparatus having a laser source for emitting a laser beam that scans a recording medium at a predetermined scanning speed, thereby recording an image having a plurality of dots on the recording medium, the apparatus comprising a device for generating a dot clock signal of a first frequency determined based at least on the scanning speed of the laser beam and a size in a scanning direction of the dots; a device for creating an image signal with reference to the dot clock signal; a reference signal generating device for generating a reference signal of a second frequency higher than the first frequency; and an exposure control device for generating a laser driving signal for driving the laser source by obtaining a logical product of the image signal and the reference signal.

With this image recording apparatus, an image can be recorded also on a recording medium with low sensitivity by controlling exposure energy (integrated quantity of light).

In one preferred embodiment, the image recording apparatus can record images properly on both a recording medium with low sensitivity and a recording medium with high sensitivity by enabling an image to be recorded properly also on the recording medium with low sensitivity.

In another preferred embodiment, the image recording apparatus can record images properly on both a recording medium with low sensitivity and a recording medium with high sensitivity even if an increased difference in sensitivity occurs between the recording mediums.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
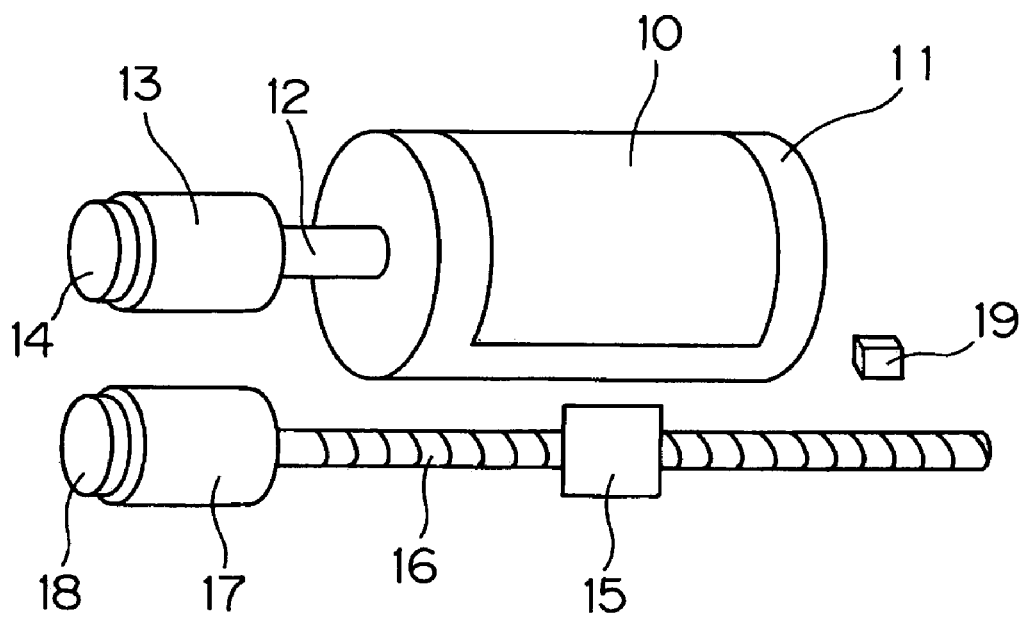
FIG. 1 is a schematic view of an image recording apparatus according to this invention.

An embodiment of this invention will be described hereinafter with reference to the drawings. FIG. 1 is a schematic view of an image recording apparatus according to this invention.

The image recording apparatus includes a recording drum 11 having a recording medium 10 mounted peripherally thereof, a drum drive motor 13 connected to the recording drum 11 through a shaft 12 for rotating the recording drum 11 about its axis, a rotary encoder 14 for detecting a rotating state of the recording drum 11, a recording head 15 having a laser diode 27, to be described hereinafter, disposed therein, the recording head 15 being meshed with a ball screw 16 to be reciprocable axially of the recording drum 11, a recording head drive motor 17 for reciprocating the recording head 15 by rotating the ball screw 16, a rotary encoder 18 for detecting a rotating state of the ball screw 16, and a calibration sensor 19 disposed laterally of the recording drum 11.

Figure 2:
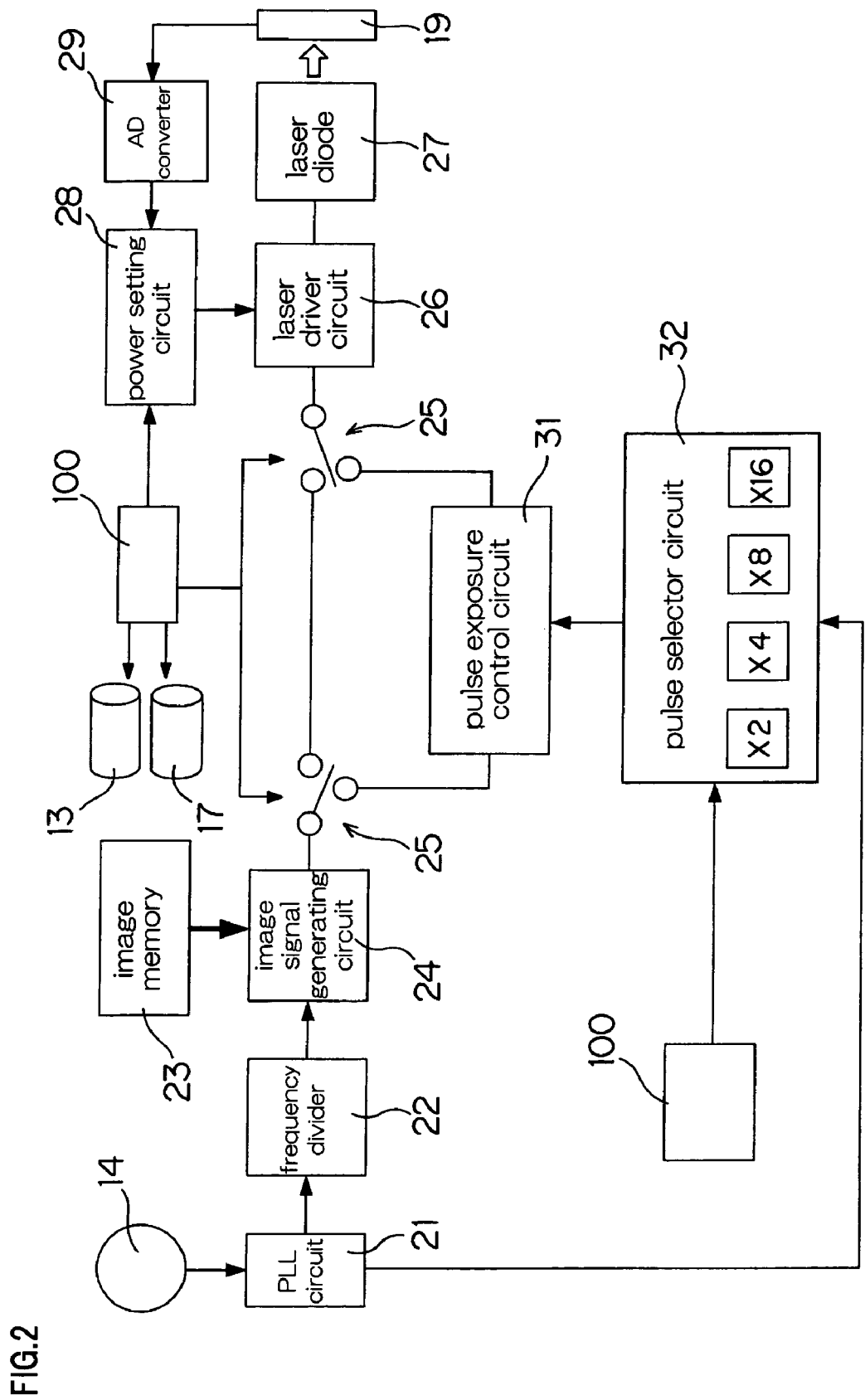
FIG. 2 is a block diagram showing a principal electrical structure of the image recording apparatus according to this invention.
Figure 3A:
FIG. 3A is a timing chart showing a reference signal.
Figure 3B:
FIG. 3B is a timing chart showing a dot clock signal.
Figure 3C:
FIG. 3C is a timing chart showing an image signal.
Figure 3D:
FIG. 3D is a timing chart showing a laser diode driving signal in a second recording mode.
Figure 4A:
FIG. 4A is a timing chart showing a reference signal.
Figure 4B:
FIG. 4B is a timing chart showing the dot clock signal.
Figure 4C:
FIG. 4C is a timing chart showing the image signal.
Figure 4D:
FIG. 4D is a timing chart showing a laser diode driving signal in the second recording mode.
Figure 5A:
FIG. 5A is a timing chart showing a reference signal.
Figure 5B:
FIG. 5B is a timing chart showing the dot clock signal.
Figure 5C:
FIG. 5C is a timing chart showing the image signal.
Figure 5D:
FIG. 5D is a timing chart showing a laser diode driving signal in the second recording mode.

FIG. 2 is a block diagram showing a principal electrical structure of the image recording apparatus according to this invention.

The image recording apparatus includes a controller 100 having a CPU as a main component thereof for performing logical operations. The controller 100 carries out various operations as described hereinafter.

The image recording apparatus includes a switching device 25 for switching between a first recording mode for use in recording images on a recording medium 10 with low sensitivity and a second recording mode for use in recording images on a recording medium 10 with high sensitivity. The switching device 25 switches between the first recording mode and second recording mode in response to commands from the controller 100. The first recording mode is a mode of irradiating the recording medium 10 with a laser beam emitted from the laser diode 27 when an image signal is ON. The second recording mode is a mode of irradiating the recording medium 10 with the laser beam emitted from the laser diode 27 when both the image signal and a reference signal are ON.

A signal of the rotary encoder 14 for detecting a rotating state of the recording drum 11 is multiplied by a PLL circuit 21 to generate a PLL clock signal. The PLL clock signal is divided by a frequency divider 22 to generate a dot clock signal. Data of an image to be recorded on the recording medium 10 (image data) is stored in an image memory 23. An image signal generating circuit 24 generates the image signal based on and timed with the dot clock signal generated by the frequency divider 22.

The laser diode 27 needs to be blinked on and off in cycles corresponding to the size of one dot which is a minimum unit of an image to be formed on the recording medium.

When, for example, a recording resolution of 2400 dpi (dot per inch) is designated, a dot sized 10.58 μm in the primary scanning direction becomes a minimum unit for laser driving. In this case, the laser beam needs to be blinked on and off in cycles corresponding to time intervals taken to scan the recording medium by approximately 10.58 μm. The frequency divider 22, therefore, generates the dot clock signal having a frequency determined based on a primary scanning speed of the laser beam and a size in the primary scanning direction of one dot.

When the switching device 25 is switched to a side for performing the first recording mode, the image signal is inputted to a laser driver circuit 26, whereby the laser diode 27 is turned on according to the image signal to record the image on the recording medium 10. That is, in this first recording mode, when the image signal is ON, the laser beam emitted from the laser diode 27 irradiates the recording medium 10.

On the other hand, when the switching device 25 is switched to a side for performing the second recording mode, the image signal is inputted to a pulse exposure control circuit 31. A pulse selector circuit 32 selectively generates reference signals having frequencies twice, four times, eight times and 16 times that of the dot clock signal, by dividing the frequency of the PLL clock signal from the PLL circuit 21. Selection of a reference signal is carried out in response to a command from the controller 100.

Each of the pulse selector circuit 32 and frequency divider 22 has a dividing ratio set such that the reference signal always has a higher frequency than the dot clock signal.

The reference signal generated by the pulse selector circuit 32 is sent to the pulse exposure control circuit 31. The pulse exposure control circuit 31 carries out a digital logic operation to obtain a logical product of the image signal and the reference signal, generates a driving signal for driving the laser diode, and outputs this signal to the laser driver circuit 26. The laser driver circuit 26 turns on the laser diode 27 according to the laser diode driving signal, to record the image on the recording medium 10. That is, in the second recording mode, when both the image signal and the reference signal are ON, the laser beam emitted from the laser diode 27 irradiates the recording medium 10.

FIGS. 3 through 6 are timing charts showing the above reference signals, dot clock signal, image signal, and the laser diode driving signals in the second recording mode. In these figures, sign A represents the reference signals, B represents the dot clock signal, C represents the image signal, and D represents the laser diode driving signals in the second recording mode. FIGS. 3A through 3D shows a case where the reference signal generated has a frequency 16 times the frequency of the dot clock signal. FIGS. 4A through 4D shows a case where the reference signal generated has a frequency eight times the frequency of the dot clock signal. FIGS. 5A through 5D shows a case where the reference signal generated has a frequency four times the frequency of the dot clock signal. FIGS. 6A through 6D shows a case where the reference signal generated has a frequency twice the frequency of the dot clock signal.

In the first recording mode, when the image signal rising synchronously with the dot clock signal is ON, the laser beam emitted from the laser diode 27 irradiates the recording medium 10. That is, in the first recording mode, the image signal represented by C in each figure is used, as the driving signal for the laser diode 27.

On the other hand, in the second recording mode, the signal with the logical product of the image signal and reference signal, represented by D in each figure, becomes the driving signal for the laser diode 27. Therefore, integrated exposure of the recording medium 10 in the second recording mode is half that in the first recording mode. This enables images to be recorded properly also on the recording medium 10 with high sensitivity.

Figure 6A:
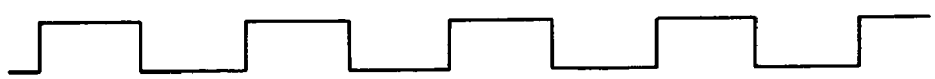
FIG. 6A is a timing chart showing a reference signal.
Figure 6B:
FIG. 6B is a timing chart showing the dot clock signal.
Figure 6C:
FIG. 6C is a timing chart showing the image signal.
Figure 6D:
FIG. 6D is a timing chart showing a laser diode driving signal in the second recording mode.

When the reference signal having about twice the frequency of the dot clock signal as shown in FIG. 6 is used, a comparison between the driving signal for the laser diode 27 in the second recording mode represented by FIG. 6D and the image signal by FIG. 6C (i.e. the driving signal for the laser diode 27 in the first recording mode) shows that the two signals can turn on simultaneously but turn off with time lags. However, the laser beam emitted from the laser diode 27 has a fixed time delay occurring at rise times and after turn-offs. Thus, there is no substantial influence on image recording accuracy.

Referring to FIG. 2 again, the laser beam emitted from the laser diode 27 is inputted to the calibration sensor 19 as necessary. Measurements by the calibration sensor 19 are inputted to a power setting circuit 28 through an AD converter 29. Thus, the output of the laser beam emitted from the laser diode 27 is adjusted to a predetermined value through the laser driver circuit 26.

This image recording apparatus turns on the laser diode 27 to produce substantially the same output as a rated output in the first recording mode, and to produce an output lower than the rated output in the second recording mode. Specifically, in the second recording mode, the controller 100 controls the laser driver circuit 26 through the power setting circuit 28 to turn on the laser diode 27 to produce an output 60 to 80%, preferably about 70%, of the rated output. The output reduced to 50% or less would change the beam profile of the laser beam emitted from the laser diode 27, which is not desirable.

Further, this image recording apparatus rotates the recording drum 11 at a relatively slow, first rotating speed in the first recording mode, and at a second rotating speed in the second recording mode faster than the first rotating speed. Specifically, for the first recording mode, the rotating speed of the recording drum 11 is set to about 100 rpm-300 rpm. On the other hand, the rotating speed of the recording drum 11 is set to about 700 rpm for the second recording mode, thereby reducing a substantial integrated quantity of light to the recording medium 10. This speed adjustment is effected by the controller 100 controlling the drum drive motor 13 and recording head drive motor 17.

In the image recording apparatus having the above construction, when recording an image on the recording medium 10 with low sensitivity, the controller 100 switches the switching device 25 to the side for performing the first recording mode. The controller 100 also transmits a command to the power setting circuit 28 for lighting the laser diode 27 to produce substantially the same output as the rated output. Further, the controller 100 controls the drum drive motor 13 and recording head drive motor 17 to set the rotating speed of the recording drum 11 to about 100 rpm-300 rpm. As a result, the laser beam applies high energy to the recording medium 10, thereby recording the image properly on the recording medium 10 with low sensitivity.

On the other hand, when recording an image on the recording medium 10 with high sensitivity, the controller 100 switches the switching device 25 to the side for performing the second recording mode. The controller 100 also transmits a command to the power setting circuit 28 for lighting the laser diode 27 to produce an output 60 to 80%, preferably about 70%, of the rated output. Further, the controller 100 controls the drum drive motor 13 and recording head drive motor 17 to set the rotating speed of the recording drum 11 to about 700 rpm. As a result, the laser beam applies low energy to the recording medium 10, thereby recording the image properly on the recording medium 10 with high sensitivity.

For the second recording mode, a reference signal corresponding to the sensitivity and characteristic of the recording medium 10 may be selected for use from among the reference signals having frequencies twice, four times, eight times and 16 times that of the dot clock signal.

In the foregoing embodiment, the reference signals having frequencies twice, four times, eight times and 16 times that of the dot clock signal are generated. Too quick a reference signal will have a problem of failing to accommodate the ON/OFF response speed of the laser diode 27. In this embodiment, the reference signals have frequencies which are integral multiples of the dot clock frequency. It is not absolutely necessary for the frequencies to be integral multiples. However, integral multiples facilitate creation of the reference signals.

The reference signals used in the foregoing embodiment have frequencies which are integral multiples of the dot clock frequency, and alternate ON and OFF. Instead, the reference signals may repeat ON, OFF and OFF to reduce the substantial integrated quantity of light to one third.

In the foregoing embodiment, laser beam irradiation is controlled by directly controlling lighting of the laser diode 27. Alternatively, for example, the laser source may always be kept on, with on-off control of the laser beam from this laser source being carried out using an AOM (acoustooptic modulator).

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2007-045509 filed in the Japanese Patent Office on Feb. 26, 2007, the entire disclosure of which is incorporated herein by reference.

What is claimed is:

1. An image recording apparatus having a laser source for emitting a laser beam that scans a recording medium at a predetermined scanning speed, thereby recording an image having a plurality of dots on the recording medium, said apparatus comprising:
    a device for generating a dot clock signal of a first frequency determined based at least on the scanning speed of said laser beam and a size in a scanning direction of said dots;
    a device for creating an image signal with reference to said dot clock signal;
    a reference signal generating device for generating a reference signal of a second frequency higher than said first frequency; and
    an exposure control device for generating a logical product of said image signal and said reference signal for driving said laser source.

2. An image recording apparatus as defined in claim 1, wherein:
    said recording medium is mounted peripherally of a recording drum rotatable about an axis thereof; and
    said dot clock signal and said reference signal are created with reference to a signal from a rotary encoder connected to said recording drum.

3. An image recording apparatus as defined in claim 2, wherein said reference signal generating device is arranged to generate a reference signal of a frequency which is n times the frequency of the dot clock signal, where n is an integer two or more.

4. An image recording apparatus as defined in claim 3, said reference signal generating device causes generation of reference signals by setting a plurality of values as said n.

5. An image recording apparatus having a laser source for emitting a laser beam that scans a recording medium at a predetermined scanning speed, thereby recording an image having a plurality of dots on the recording medium, said apparatus comprising:
    a device for generating a dot clock signal of a first frequency determined based at least on the scanning speed of said laser beam and a size in a scanning direction of said dots;
    a device for creating an image signal with reference to said dot clock signal;
    a reference signal generating device for generating a reference signal of a second frequency higher than said first frequency; and
    an exposure control device for generating a laser driving signal for driving said laser source;
    wherein said exposure control device is arranged to switch between a first recording mode for using said image signal as said laser driving signal, and a second recording mode for generating said laser driving signal by obtaining a logical product of said image signal and said reference signal.

6. An image recording apparatus as defined in claim 5, wherein:
said recording medium is mounted peripherally of a recording drum rotatable about an axis thereof; and
said dot clock signal and said reference signal are created with reference to a signal from a rotary encoder connected to said recording drum.

7. An image recording apparatus as defined in claim 6, wherein:
in said first recording mode, said recording drum is rotated at a first rotating speed; and
in said second recording mode, said recording drum is rotated at a second rotating speed faster than said first rotating speed.

8. An image recording apparatus as defined in claim 7, wherein:
in said first recording mode, said laser source is lit to produce substantially the same output as a rated output; and
in said second recording mode, said laser source is lit to produce an output lower than said rated output.

9. An image recording apparatus as defined in claim 8, wherein said reference signal generating device is arranged to generate a reference signal of a frequency which is n times the frequency of the dot clock signal, where n is an integer two or more.

10. An image recording apparatus as defined in claim 9, said reference signal generating device causes generation of reference signals by setting a plurality of values as said n.

* * * * *